United States Patent
Ucar et al.

(10) Patent No.: US 12,499,753 B2
(45) Date of Patent: Dec. 16, 2025

(54) SYSTEMS AND METHODS FOR LEVERAGING EVASIVE MANEUVERS TO CLASSIFY ANOMALIES

(71) Applicant: TOYOTA MOTOR ENGINEERING & MANUFACTURING NORTH AMERICA, INC., Plano, TX (US)

(72) Inventors: Seyhan Ucar, Mountain View, CA (US); Ryan Mercer, Colton, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 356 days.

(21) Appl. No.: 17/476,144

(22) Filed: Sep. 15, 2021

(65) Prior Publication Data
US 2023/0083625 A1    Mar. 16, 2023

(51) Int. Cl.
| | | |
|---|---|---|
| *G08G 1/01* | (2006.01) | |
| *G06V 10/75* | (2022.01) | |
| *G06V 20/54* | (2022.01) | |
| *G06V 40/20* | (2022.01) | |

(52) U.S. Cl.
CPC ......... *G08G 1/0133* (2013.01); *G06V 10/751* (2022.01); *G06V 20/54* (2022.01); *G06V 40/20* (2022.01)

(58) Field of Classification Search
CPC ...... G08G 1/0133; G08G 1/166; G08G 1/164; G08G 1/0112; G06V 10/751; G06V 20/54; G06V 40/20
USPC ....................................................... 701/117
See application file for complete search history.

(56) References Cited

U.S. PATENT DOCUMENTS

| | | | |
|---|---|---|---|
| 8,781,722 B2 | 7/2014 | Flehmig | |
| 8,948,929 B2 | 2/2015 | Chun | |
| 9,528,842 B2 | 12/2016 | Braeuchle | |
| 9,637,121 B2 | 5/2017 | Yi | |
| 10,347,127 B2 | 7/2019 | Droz | |
| 10,357,195 B2 | 7/2019 | Beck | |
| 10,414,407 B1 | 9/2019 | Slusar | |
| 10,775,179 B1 | 9/2020 | Hayward | |
| 10,824,145 B1 * | 11/2020 | Konrardy | B60R 25/102 |
| 10,996,073 B2 | 5/2021 | Tang | |
| 10,997,430 B1 * | 5/2021 | Slavin | G06V 20/56 |
| 2016/0339910 A1 | 11/2016 | Jonasson | |
| 2017/0178352 A1 * | 6/2017 | Harmsen | G06T 17/05 |
| 2018/0158323 A1 * | 6/2018 | Takenaka | G06V 20/46 |
| 2019/0329770 A1 * | 10/2019 | Rajab | G08G 1/163 |
| 2020/0026302 A1 * | 1/2020 | Wolcott | G05D 1/0088 |
| 2020/0242922 A1 * | 7/2020 | Dulberg | G08G 1/012 |

(Continued)

*Primary Examiner* — Helal A Algahaim
*Assistant Examiner* — John D Holman
(74) *Attorney, Agent, or Firm* — SHEPPARD, MULLIN, RICHTER & HAMPTON LLP; Daniel N. Yannuzzi

(57) ABSTRACT

Systems and methods are provided for the classification of anomalies present in road regions. Anomalies may be extrinsic or intrinsic. Intrinsic anomalies may pose a greater safety risk to drivers than extrinsic anomalies. Intrinsic anomalies may be identified by detection of an evasive maneuver of a vehicle in a road region, measurement of the properties of other vehicles and the surrounding environment in the road region, determination of a vehicle behavior pattern in a road region, and comparison of the determined vehicle behavior pattern in the road region to other vehicle behavior patterns stored in a database.

11 Claims, 8 Drawing Sheets

(56) References Cited

U.S. PATENT DOCUMENTS

| | | | |
|---|---|---|---|
| 2021/0049908 A1* | 2/2021 | Pipe | G08G 1/0112 |
| 2023/0256971 A1* | 8/2023 | Buda | G08G 1/0141 |
| | | | 701/117 |

* cited by examiner

SYSTEMS AND METHODS FOR LEVERAGING EVASIVE MANEUVERS TO CLASSIFY ANOMALIES

TECHNICAL FIELD

The present disclosure relates generally to vehicle anomaly detection and evasive maneuvers, and in particular, some implementations may relate to classification of anomalies and distinction between classes of anomalies based on evasive maneuver or other vehicle behavior patterns.

DESCRIPTION OF RELATED ART

An anomaly is an unusual, unexpected, or otherwise notable event, which, relative to a particular context, is different or distinguishable in some way. For instance, an anomaly may be an unusual action or event that is distinguishable relative to other actions or events or relative to a particular environment in which the anomaly and other actions or events occur. An anomaly may occur at an unusual location and/or at an unusual time. In a vehicular context, anomalies may be present or may occur while a driver is operating a vehicle. For example, a roadblock or pothole or other obstacle may be present on a road being traversed by the vehicle. A driver in the part of the road where the anomaly is present may have to avoid the anomaly to prevent a collision or avoid harm. A driver may employ an evasive maneuver to avoid the anomaly. Although some conventional systems may detect the existence of anomalies, the considerations, factors, data, etc. taken into account to detect anomalies do not necessarily take into account the context, circumstances of actions/events determined to be anomalies. Accordingly, the detection of anomalies using conventional systems may be inaccurate or misleading. Moreover, conventional anomaly detection systems are limited to detection, and are not able to characterize or classify detected anomalies.

BRIEF SUMMARY OF THE DISCLOSURE

According to various embodiments of the disclosed technology an anomaly classification system and/or method may include detecting a driving action of a first vehicle in a road region. The driving action may, but need not be, an evasive maneuver. The system/method may then involve identifying nearby, secondary vehicles also present in or around the road region. The system/method may then involve collecting sensor data from the first and secondary vehicles. The data may then be analyzed to determine a collective behavior pattern for the first and second vehicles. The determined behavior pattern may then be compared to other vehicle behavior patterns. These other vehicle behavior patterns may be stored in a database. These other vehicles behavior patterns may each be mapped to a particular type of anomaly. The comparison of the vehicle behavior pattern to other vehicle behavior patterns, may reveal whether an anomaly is present in the road region.

Different types of anomalies may be present in a road region. For example, an extrinsic anomaly may be present in a road region. An extrinsic anomaly may be a type of anomaly that is related to the environment comprising or surrounding the road region. For example, an extrinsic anomaly may be a physical obstacle present in a road region. In another example, an intrinsic anomaly may be present in a road region. In intrinsic anomaly may be a type of anomaly that is related to characteristics of a driver. For example, an intrinsic anomaly may be an aggressive driver that is displaying irregular and/or dangerous driving behavior on account of the driver's aggression.

In an embodiment, the comparison of the vehicle behavior pattern to other vehicle behavior patterns, may reveal not only whether an anomaly is present in the road region but also whether any detected anomaly is extrinsic or intrinsic.

In another embodiment, a detected vehicle behavior pattern may not be consistent with any other vehicle behavior pattern in the database. In that instance, other human observation techniques may be employed to determine whether the anomaly is intrinsic or extrinsic.

In an embodiment, an intrinsic anomaly may be detected and comparison of the vehicle behavior pattern for the first and secondary vehicles in the road region with other vehicle behavior patterns may reveal the level of risk posed by the intrinsic anomaly.

In an embodiment, an anomaly database may comprise vehicle behavior patterns relevant to and/or associated with one or more selected geographic regions.

In another embodiment, a road safety system may comprise an anomaly database. The anomaly database may store vehicle behavior patterns which map to specific types of anomalies. The types of anomalies may be extrinsic, intrinsic, or some other type. The types of anomalies may also relate to the level of risk posed by a particular anomaly. A road safety system may also include a network of connected vehicles. Each vehicle in the network of connected vehicles may be equipped with sensors and configured to share data about themselves and their surrounding environment with the network. A road safety system may also include an anomaly classification module. The anomaly classification module may be configured to perform an anomaly classification protocol. A road safety system may also include a resource deployment plan. The resource deployment plan may be configured to identify and deploy appropriate resources based on the type of anomaly detected. A road safety system may also include a network of connected authorities. The network of connected authorities may be configured to deploy responsive resources. The road safety system may operate such that, upon detection of a driving action performed by a first connected vehicle, the anomaly classification module identifies secondary connected vehicles in proximity to the first connected vehicle and analyzes sensor data from the first and secondary connected vehicles to determine a vehicle behavior pattern of the first and secondary connected vehicles in the road region. The road safety system may further operate such that the anomaly classification module compares the determined vehicle behavior pattern to other vehicle behavior patterns in the anomaly database to confirm the existence of the anomaly, and if an anomaly is present, determine whether the detected anomaly is extrinsic or intrinsic. The road safety system may further operate such that if the detected anomaly is intrinsic, the anomaly classification module further determines the level of risk posed by the intrinsic anomaly and transmits its determination to connected authorities. The road safety system may further operate such that the authorities, based on the transmitted information deploy appropriate mitigation resources.

In an embodiment, connected authorities may include law enforcement bodies, traffic control authorities, policymakers, and emergency services providers.

In an embodiment, mitigation resources may include ambulances, paramedics, police cars, street sweeping vehicles, and firetrucks.

In an embodiment, an anomaly database may include efficient vehicle behavior patterns that may be transmitted as instructions to connected vehicles in response to a detected and classified anomaly.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
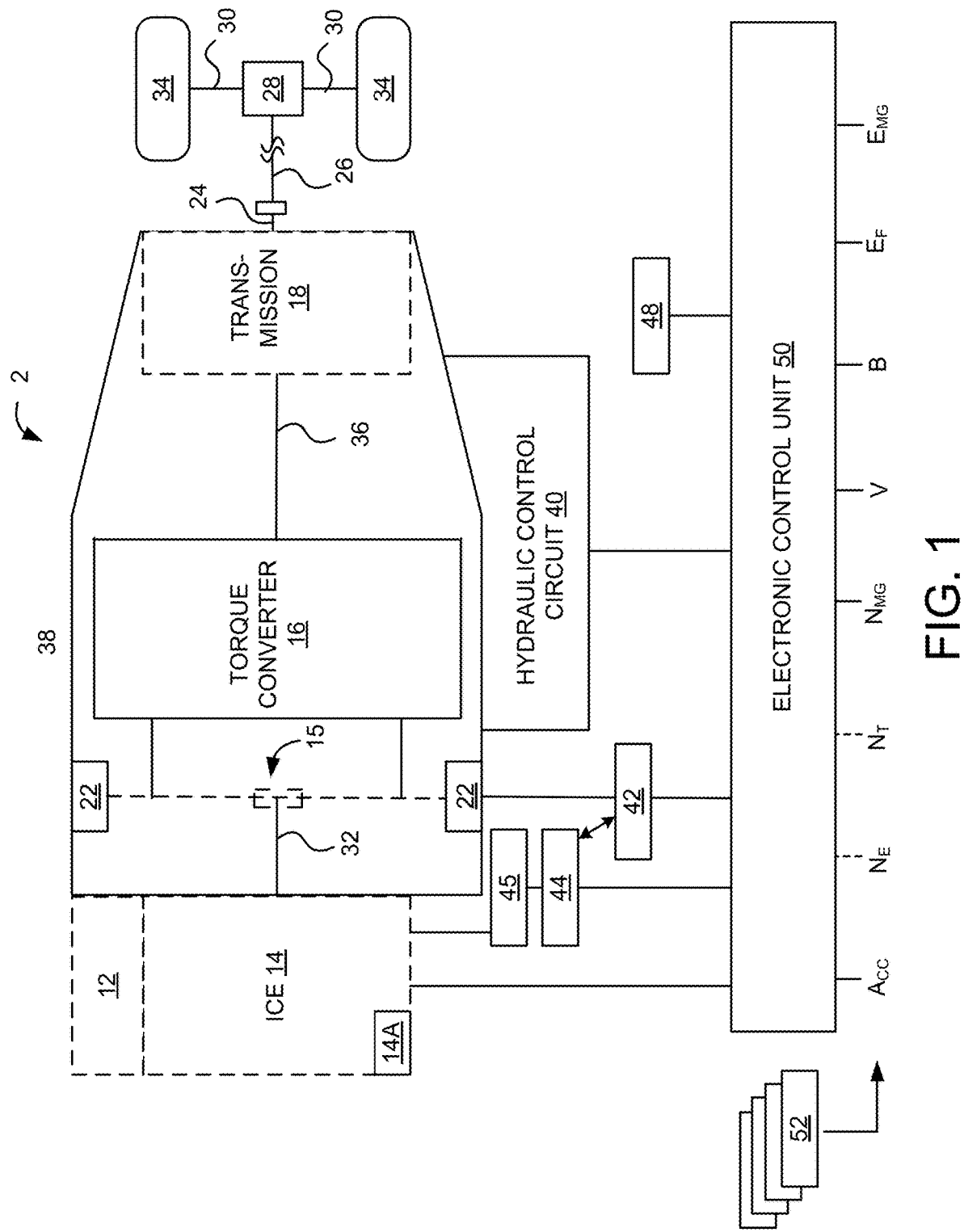
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein can provide systems and methods for both the detection and classification of anomalies. Measured behavior patterns in a geographic area may correspond to the presence of an anomaly at a fixed geographic location. For instance relative driving behavior in a road region may suggest drivers are evading a physical obstacle on the road. Measured behavior patterns may also correspond to the presence of an anomaly that is advancing through geographic areas. For instance, relative driving behavior in sequential road regions may suggest drivers are evading another vehicle that is advancing through road regions. The other vehicle may be an emergency response or law enforcement vehicle, such as an ambulance, police car, or firetruck. Drivers may evade such vehicles because they are obligated to do so by law. The other vehicle may also be a vehicle that is driving dangerously and/or erratically. In some instances, measured behavior patterns may not clearly correspond to a particular class of anomaly. In this case, further information and support may be requested to classify the anomaly and/or anomalies to which the measured driving behavior corresponds.

Systems and methods for the detection and classification of anomalies may be implemented with several elements and/or components. For instance, sensors, either on/in vehicle(s) or the surrounding environment, may detect an evasive maneuver performed by a vehicle. This information may be shared with a server, which in turn may track and analyze sensor data from surrounding vehicles and the surrounding environment. Measured behavior patterns corresponding to identified anomalies may also be stored in a database. Reference to the stored patterns may assist in identifying corresponding anomalies with real-time measured behavior patterns.

As discussed above, an anomaly is an action or event that happens in an unusual location at an unusual time. Anomalies may be present while a driver is driving on a road. For example, a roadblock or pothole or other obstacle may be on the road. A driver in the part of the road where the anomaly is present may have to avoid the anomaly to prevent a collision. A driver may employ an evasive maneuver to avoid the anomaly. Other anomalies may be described as intrinsic to a driver. For instance, a driver may drive in an irregular pattern on the road. A driver may drive irregularly due to numerous factors including the level of traffic congestion, weather conditions, distractedness, and intoxication.

A driver's past habits and tendencies may be analyzed by correlating the habits and tendencies with environmental conditions. These habits and tendencies may include eye movements, face movements, and heart rate. The analysis may assist in predicting when a driver will perform certain habits. In another example, audio signals may be analyzed to determine whether a driver's use of the vehicle horn is excessive. Excessive vehicle horn use may correlate with and be used to identify driver aggressiveness. In another example, telematics data may be analyzed to determine whether a travel event exists based upon received data. In another example, vehicles may be grouped based on a predefined similarity condition. A similarity condition may be, for example, deceleration of the vehicle. The driving pattern of each vehicle in the group may then be used to identify an abnormal driving pattern. In another example, a driving analysis system may be configured to analyze differential driving data to determine unsafe driving behaviors, such as aggressive behavior, distracted behavior, or intoxicated behavior.

These examples do not explain how detection of an anomaly, and behaviors identified as correlated to an anomaly, may be misleading. For instance, vehicle horn use does not always correlate with driver aggression. A horn may be used to alert other drivers to a safety issue. Differences in horn use may vary regionally. In another example, failing to leave sufficient stopping distance ("tailgating") may or may not correlate with driver aggression. Vehicles in heavily congested areas or in areas requiring merging may leave less stopping distance than usual as warranted by surrounding conditions.

In part, these examples do not explain how detection of any anomaly may be misleading because they do not account for the behavior of other drivers sharing the same environment. Drivers facing the same anomalies are likely to perform similar actions to account for the anomalies. For example, drivers sharing the road with an intoxicated driver may swerve to avoid the intoxicated driver. In other example, drivers sharing the road may perceive the distracted driver as swerving due to inattentiveness and may change lanes to avoid the distracted driver. In another example, drivers sharing the road may perform similar evasive maneuvers when they encounter an obstacle such as a pothole or fallen object blocking the road.

Some systems are related to evasive maneuvers and/or actions that a driver may take. For instance, when a vehicle is at risk, a drivable zone surrounding the vehicle may be identified. An evasive maneuver may be safely performed within the identified drivable zone. The evasive maneuver may be planned to avoid a risk, such as a collision with another vehicle. In another example where a vehicle is performing an evasive maneuver, an optimization is applied to find optimal vehicle behavior regarding stability and comfort. In another example, a nominal trajectory is calculated whenever an obstacle is detected in the path of the vehicle. The vehicle is then instructed to perform an evasive maneuver following the nominal trajectory.

These examples focus on the prevention of a collision by planning and executing an evasive maneuver. However, the examples do not explore and do not take into consideration the differences in circumstances under which an evasive maneuver or other driving action might be necessary. For instance, the examples do not distinguish between external anomalies, such as physical obstacle on the road around which a driver must take an evasive maneuver, and intrinsic anomalies, such as taking an evasive maneuver due to distracted driving behavior.

Both the detection and classification of anomalies is important because anomalies can jeopardize driver safety and increase traffic congestion. Not all anomalies are alike. Understanding the type of anomaly at issue informs the best way to protect drivers on the road. Additionally, identification of anomalies based on consideration of variables, observations, and deviations may be misleading and inaccurate. The behavior of any given driver on a particular area of the road influences the behavior of other drivers in and around that area. Therefore, a given driver's response to an anomaly may influence the behavior of nearby drivers. For instance, if a driver comes across the aftermath of a vehicle collision on the road and slows down to observe, other drivers near that driver will likely also decelerate in response, whether or not the collision aftermath is impeding their driving trajectory and whether or not they too can see the aftermath of the collision. This type of anomaly causes traffic congestion.

In other situations, drivers may perform unique driving behavior to negotiate an anomaly. For instance when a driver observers another driver driving erratically in a nearby area, the driver may believe the erratic other driver is intoxicated. The driver may change lanes and/or take other actions to create distance between the driver and the intoxicated driver in an effort to prevent a collision. These kinds of behaviors may be evasive maneuvers. An evasive maneuver is a fast and effective action that is made intentionally to avoid or reduce the chances of collision with another driver, another vehicle, an obstacle, a pedestrian, or other people and things in or near a driving area. Evasive maneuvers are beneficial because they prevent and/or reduce collisions.

Patterns of driving behavior can be investigated to identify and classify different types of anomalies. For instance, a driving behavior such as an evasive maneuver may be used to identify an anomaly. Patterns of evasive maneuvers or other driving behaviors may be used to further classify the anomaly. For instance the way one driver or even a group of drivers sharing the road react to an anomaly may reveal whether the anomaly is extrinsic or intrinsic. For instance if one driver encounters an extrinsic anomaly, such as a physical object blocking the road, the driver may take an evasive maneuver to avoid the object. Other drivers may perform a nearly identical maneuver in the same geographical area of a road region when they encounter the object. Alternatively, a driver who is drunk may drive erratically. Other drivers sharing the road with the intoxicated driver may change lanes or otherwise distance themselves from the erratic driver. The exact evasive maneuver taken may depend where the other drivers are on the road relative to the intoxicated driver. The evasive maneuvers taken may differ from evasive maneuvers taken to avoid a physical obstacle located on one area of a road. Analyzing the pattern of evasive maneuvers may then provide information about the kind of anomaly present so it can be classified.

Embodiment 1—Driving Patterns Associated with Extrinsic Anomalies

In one embodiment, whenever an evasive maneuver, action, or similar driving behavior is detected, that maneuver is shared with a server. The server initiates a process to track other vehicles in or near the same area of the road where the evasive maneuver was detected. Evasive maneuvers, actions, and behaviors of surrounding drivers are also tracked and shared with the server. The server further investigates the performed maneuver(s) to determine a pattern. The pattern is then compared with other driving behavior patterns stored in a database. The driving behavior patterns stored in the database may corresponding to a particular type of anomaly. The pattern determination and comparison may reveal whether the detected evasive maneuver or other driving behavior was performed in response to an extrinsic or intrinsic anomaly.

For instance, if an initial evasive maneuver occurs at a specific geographical region on the road, and subsequent evasive maneuvers of nearby drivers also occur at or relative to a specific physical area of the road, the anomaly may be classed as extrinsic. Extrinsic anomalies may include physical obstacles located at set geographic areas on a road. Extrinsic anomalies may include potholes, fallen objections, lane closures, traffic accidents obstructing the road way, damaged areas of the road way, and other types of geographically set obstacles.

Embodiment 2—Driving Patterns Associated with Intrinsic Anomalies

In another embodiment, pattern determination and comparison may reveal an intrinsic anomaly. For instance, an intrinsic anomaly may advance through a series of road regions. Other vehicles sharing the road with an intrinsic anomaly may also advance through a series of road regions with the intrinsic anomaly. An initial evasive maneuver may occur at one point but subsequent evasive maneuvers of nearby drivers may occur at varying points along the series of road regions. Based on a measured pattern of evasive maneuvers, it may be determined that the anomaly is following a certain trajectory down the road or is moving. It may be determined that the anomaly a particular moving vehicle. For instance, distracted, intoxicated, or aggressive drivers may exhibit erratic driving patterns. Nearby drivers may perform evasive maneuvers or take other driving actions to distance themselves from a distracted, intoxicated, or aggressive driver as the distracted, intoxicated, or aggressive driver advances through a series of road regions.

Embodiment 3—Driving Patterns Requiring Further Information

In another embodiment, the pattern detected may not be consistent with any anomaly pattern stored in the database.

The database may not have enough information to determine whether the detected pattern shows an extrinsic or intrinsic anomaly. In this case, support may be initiated. For example, the server may request verification from non-vehicle associated sensors in or near the road region or regions where a pattern of evasive maneuvers and/or other driving behaviors are detected. For example, a traffic light in a road region of interest may take a picture of the surrounding area and share this information with the server. The server may initiate a process to analyze the picture and determine whether an anomaly is present and, if so, what type of anomaly is present. For example, a picture taken from a traffic light sensor may show a stalled truck blocking a road way.

In another example, a server may request additional information from a nearby vehicle or vehicles. Vehicles within a certain distance threshold to where a pattern of evasive maneuvers and/or other driving behaviors are detected may be equipped with sensors and may communicate with the server. These vehicles, like the traffic light example, may be able to capture images of their surrounding environment. These vehicles may also be equipped with other types of sensors, such as microphones and/or infrared sensors or other types of sensors. For example a vehicle equipped with a microphone may be able to capture honking horns which may signify a traffic event and provide additional information to identify an anomaly. For instance, honking horns may signify an intrinsic anomaly since drivers use their horns to communicate with other drivers. Once an anomaly pattern is determined, the determined anomaly pattern may be stored in the database for subsequent use.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for leveraging evasive maneuvers to detect and classify anomalies can be implemented in other types of vehicle including gasoline- or diesel-powered vehicles, fuel-cell vehicles, electric vehicles, or other vehicles.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 2 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MS}$, of the motor 22 (motor rotational speed), and vehicle speed, $N_V$. These may also include torque converter 16 output, $N_T$ (e.g., output amps indicative of motor output), brake operation amount/ pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The examples of FIG. 1 are provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
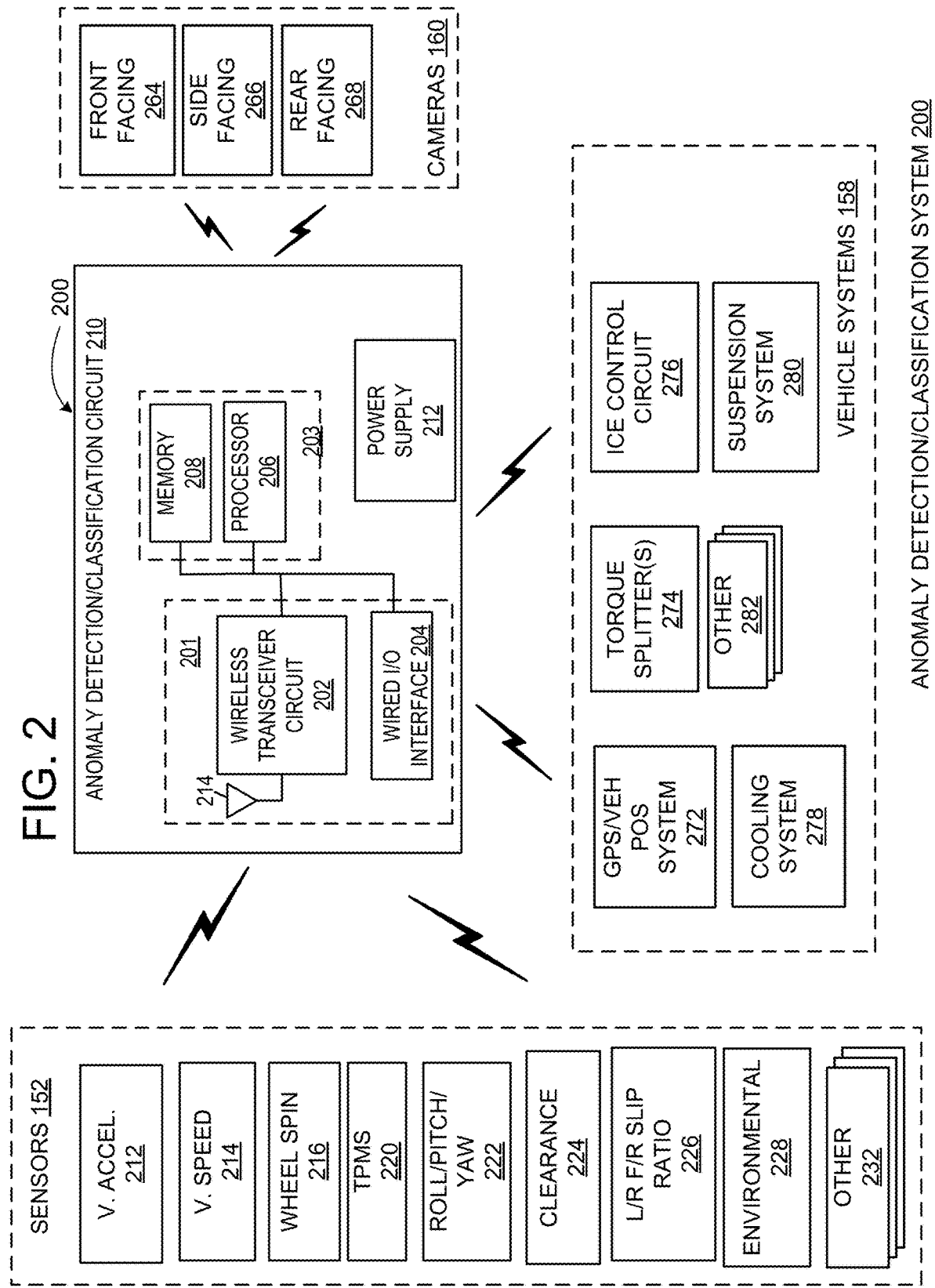
FIG. 2 illustrates an example architecture for detecting and classifying vehicle driving patterns in accordance with one embodiment of the systems and methods described herein.
Figure 3:
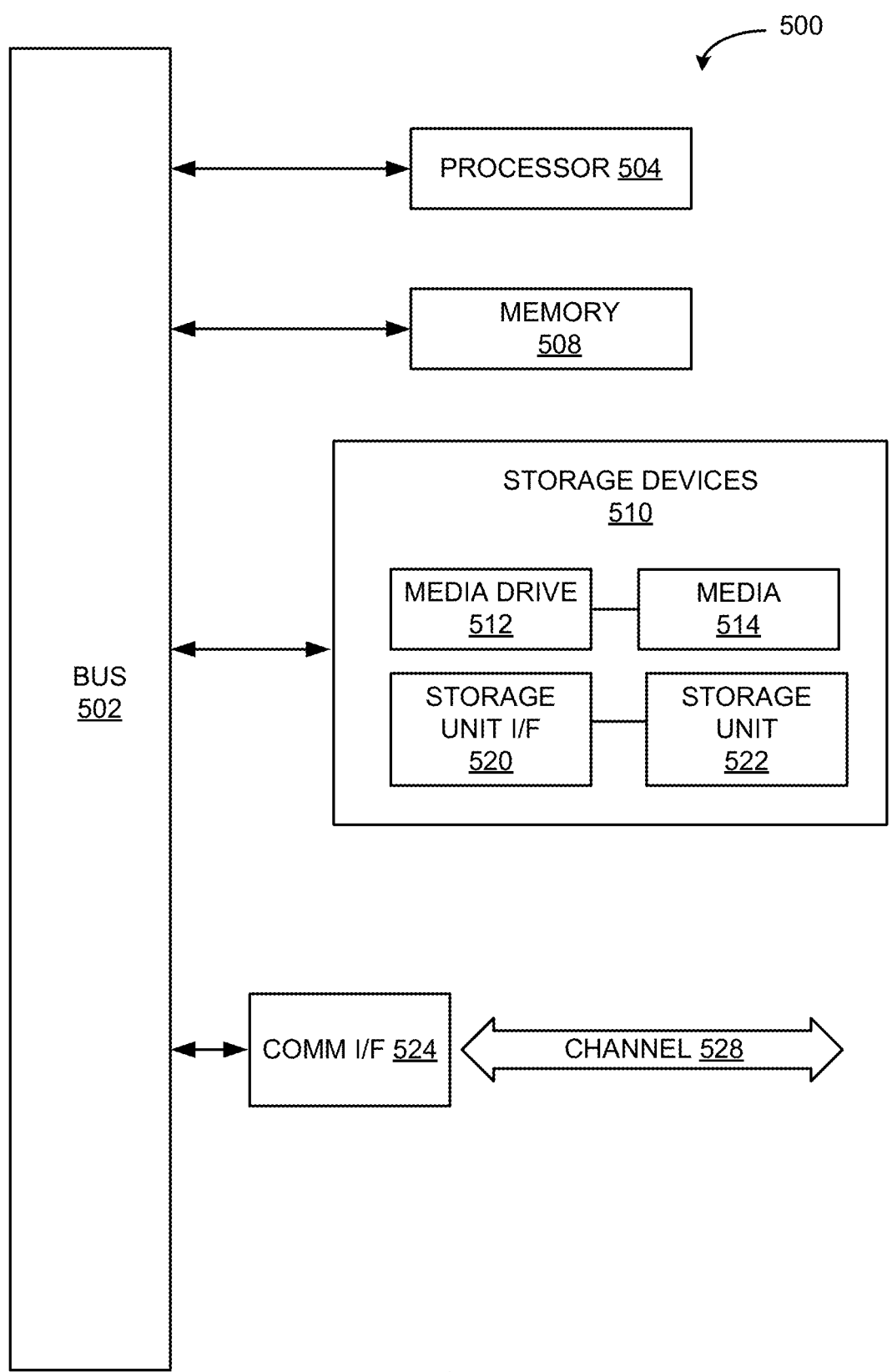
FIG. 3 is an example computing component that may be used to implement various features of embodiments described in the present disclosure.

FIG. 2 illustrates an example architecture for detecting and classifying anomalies in accordance with one embodiment of the systems and methods described herein. In this example, anomaly detection and classification system 200 includes an anomaly detection/classification circuit 210, a plurality of sensors 152, and a plurality of vehicle systems 158. Sensors 152 and vehicle systems 158 can communicate with anomaly detection/classification circuit 210 via a wired or wireless communication interface. Sensors may include vehicle sensors and roadway infrastructure sensors. Information relevant to detecting and classifying anomalies may be obtained from a first vehicle in a road region, other vehicles in a road region, and surrounding roadway infrastructure.

Although sensors 152 and vehicle systems 158 are depicted as communicating with anomaly detection/classification circuit 210, they can also communicate with each other as well as with other vehicle systems. Anomaly detection/classification circuit 210 can be implemented as an ECU or as part of an ECU such as, for example electronic control unit 50. In other embodiments, anomaly detection/classification circuit 210 can be implemented independently of the ECU.

Anomaly detection/classification circuit 210 in this example includes a communication circuit 201, a decision circuit (including a processor 206 and memory 208 in this example) and a power supply 212. Components of anomaly detection/classification circuit 210 are illustrated as communicating with each other via a data bus, although other communication in interfaces can be included.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to anomaly detection/classification circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up an anomaly detection/classification circuit 210.

Communication circuit 201 either or both a wireless transceiver circuit 202 with an associated antenna 214 and a wired I/O interface 204 with an associated hardwired data port (not illustrated). As this example illustrates, communications with anomaly detection/classification circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by anomaly detection/classification circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 52 can include additional sensors that may or not otherwise be included on a standard vehicle 10 with which the anomaly detection/classification system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of assist-mode system 200.

During operation, anomaly detection/classification circuit 210 can receive information from various vehicle sensors to determine whether an anomaly detection/classification procedure should be implemented. Communication circuit 201 can be used to transmit and receive information between anomaly detection/classification circuit 210 and sensors 152, and anomaly detection/classification circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to implement an anomaly classification/detection procedure. Additionally, communication circuit 201 can be used to send an alert signal or other information to various vehicle and environmental systems as part of implementing the anomaly detection/classification procedure. For example, as described in more detail below, communication circuit 201 can be used to send signals to, for example, other vehicles in in a geographic area of interest and/or entities in or near that geographic area including law enforcement, emergency response, and traffic control entities. Examples of this are described in more detail below.

Figure 4:
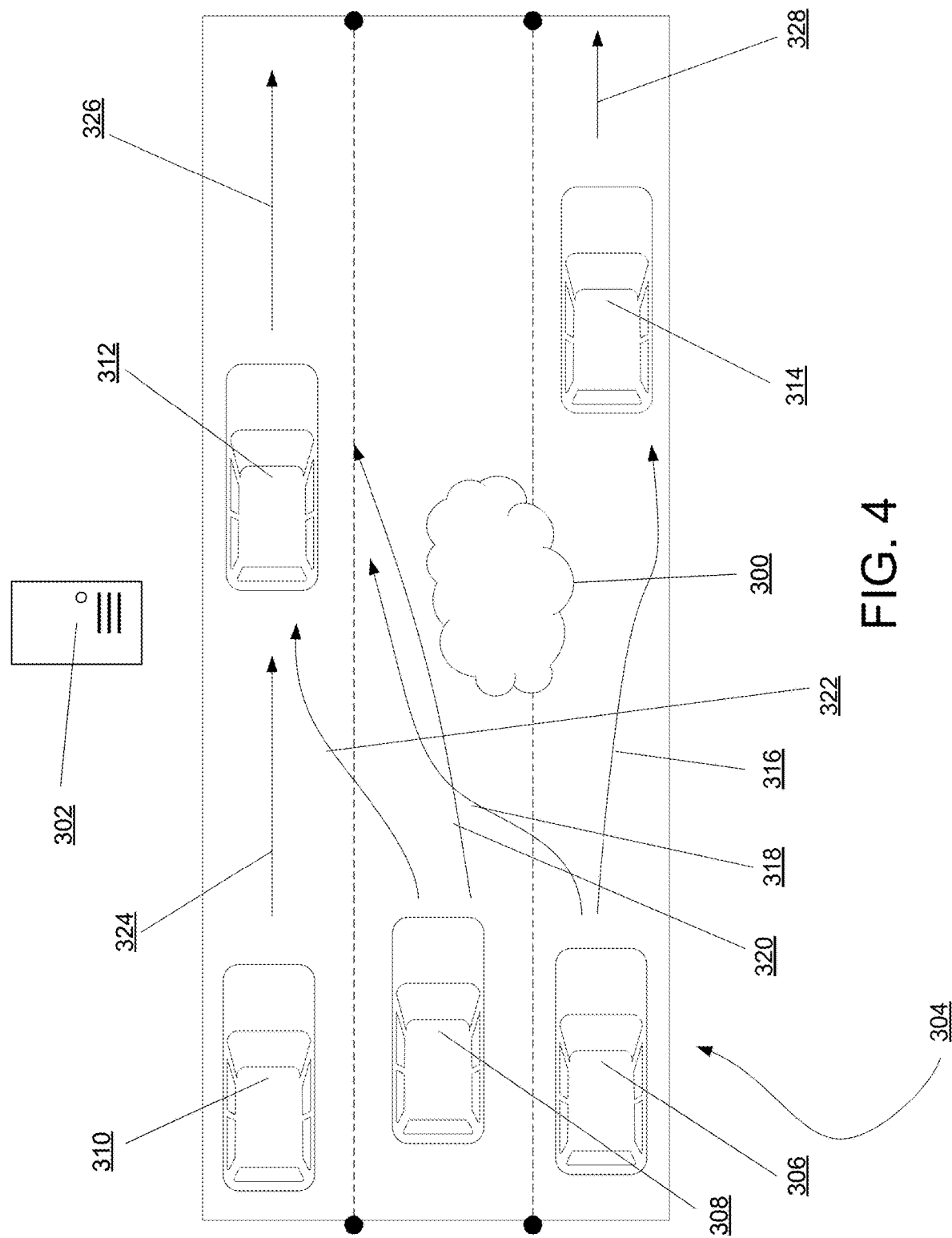
FIG. 4 is an example of a scenario of vehicles evading an extrinsic anomaly.
Figure 5:
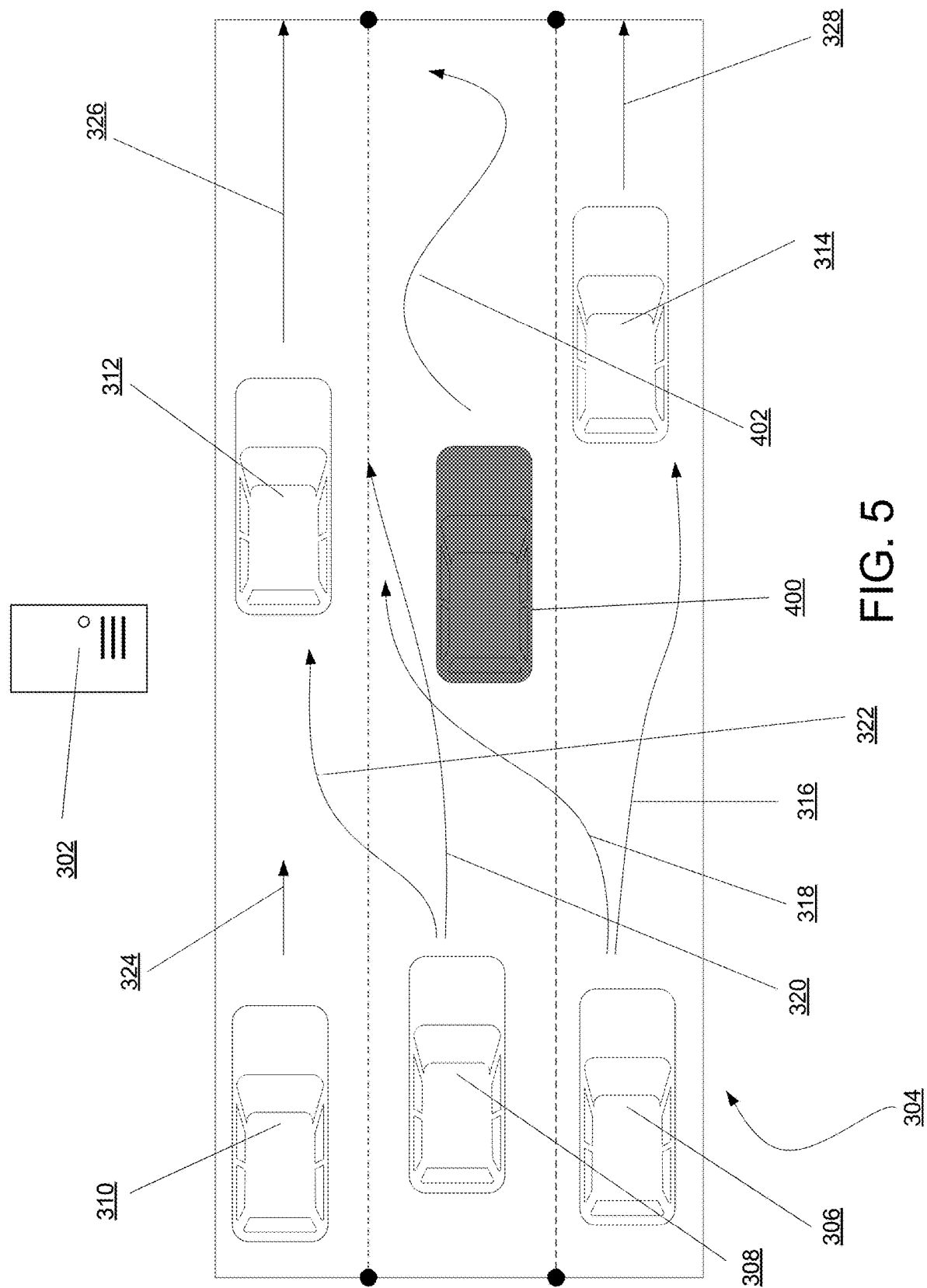
FIG. 5 is an example of a scenario of vehicles evading an intrinsic anomaly.

FIGS. 4 and 5 illustrate example scenarios of vehicles negotiating anomalies. Vehicles 306, 308, 310, 312, 314 may share the road in a particular road region 304. A first vehicle 314 may travel through a particular road region 304. As the first vehicle 314 travels through a particular road region 304, the first vehicle 314 may measure and record information. The first vehicle 314 may measure and record internal information about itself. The first vehicle 314 may measure and record vehicle operating conditions or characteristics. The first vehicle 314 may also detect signals that can be used to derive vehicle operating conditions or characteristics. For example, vehicle operating characteristics may include, but are not limited to, an accelerator operation amount, a revolution speed of the internal combustion engine, a rotational speed of the motor, and the speed of the vehicle. Other vehicle operating characteristics may include, but are not limited to, torque converter output, brake operation amount, brake operation pressure, and battery charge amount. The first vehicle 314 may have a plurality of sensors that can be used to detect these vehicle operating conditions or characteristics as the vehicle travels through a road region 304.

The first vehicle 314 may also measure and record information about its surrounding environment as it travels through a road region 304. These external conditions may include weather conditions such as humidity, precipitation, snow, glare, fog, wind and any weather-related other conditions that affect visibility, traction, and other driving parameters in the road region 304. The external conditions may also include information about other vehicle present in the road region 304. For example, these conditions may include the distance between the first vehicle 314 and other vehicles, the speed at which other vehicle are traveling, the acceleration of the other vehicles, the size of the other vehicles, and other characteristics of the other vehicles. The external conditions may also include properties of the road region 304. For instance, these properties may include the type of road material and amount of friction provided, the presence of physical obstacles on or near the roadway, and other nearby presences that may affect driving. For instance, an airport in close proximity to the road region 304 may influence driving patterns due to increased noise and increased driver distraction from watching landing planes.

The information measured and recorded by the first vehicle 314 as it travels through a road region 304 may be communicated to a server 302. The server 302 may store, organize, and transmit this information. The information may be transmitted to the server in real time. The information may be transmitted to the server automatically, without any action on behalf of the driver. The server 302 may use the information transmitted by the first vehicle 314 to detect any evasive maneuvers performed by the first vehicle 304. An evasive maneuver may be any driver-initiated action, behavior, or pattern taken to prevent an adverse incident in a road region 304. For example, driver behaviors and actions such as deceleration, abrupt braking, swerving to the left or right, sharp turns, drifting to the left or right, u-turns, and other behaviors and actions may constitute evasive maneuvers. Adverse incidents may include collisions with physical obstacles such as debris, animals, or barriers on the road region 304, other vehicles, or pedestrians. Adverse incidents may also include passage through an unsafe area of the road, such as abrasive or icy terrain. In some instances, evasive maneuvers may successfully prevent adverse incidents. In other instances, evasive maneuvers may fail to prevent adverse incidents.

In an embodiment, information measured and recorded by the first vehicle 314 as it travels through a road region 304 may be communicated to a first server. Information can be relayed from the first server to one or more subsequent servers as the first vehicle 314 and other vehicles advance through a series of road regions. The servers may be part of a roadway infrastructure. If one or more vehicles is unable to connect to any given server, processing can resume with the next server within range. In another embodiment, information collected and processed by an edge/cloud server may be pushed to vehicles and other entities traveling on and/or located nearby a given road region. The information may be pushed to vehicles and entities within a set threshold distance from the first vehicle. Updated information may be pushed out again to other vehicles and entities with a threshold distance form the first vehicle as the first vehicle advance through a series of road regions.

In an embodiment, information may be measured, processed, and pushed out to nearby vehicles and entities in real-time as vehicles advance along a road region. For example, a connected vehicle may perform a driving action while advancing through a road region. This driving action may trigger identification of nearby vehicles passing through the road region. Information may be measured form the first vehicle and nearby vehicles to determine their collective driving actions. The collective driving actions may be consistent with a pattern corresponding to a particular type of anomaly. Information about the anomaly, may then be pushed out to vehicles passing through the road region.

Generally, drivers perform evasive maneuvers in response to one or more anomalies present in a road region 304. Anomalies may fall into two or more categories. For instance some anomalies may be extrinsic. Extrinsic anomalies are physical conditions present in a road region 304. Their existence does not depend on real-time or ongoing human behavior and decision-making. For example, a physical obstacle in the road is an extrinsic anomaly. Physical obstacles may include debris, carcasses, abandoned vehicles, abandoned traffic management equipment, such as cones, and other types of physical objects that block a road region 304. Extrinsic anomalies may also include defects in a road region 304 itself, such as potholes and patches of abrasive terrain. Extrinsic anomalies may also include weather effects on a road region 304. For instance an extrinsic anomaly may be related to a weather condition. For instance, during certain hours of the day and certain times of year, a particular road region 304 may be subject to extreme glare which affects driving patterns in that area. Other weather related extrinsic anomalies may include icy patches of road, slick patches of road, and other decreased visibility conditions such as fog.

Extrinsic anomalies may also reflect circumstances surrounding a road region 304. For instance, the aftermath of a vehicle collision may create a roadside distraction which may result in adapted driving behaviors. In another example, the presence of an airport near a road region 304 may present an extrinsic anomaly as the loud sounds and presence of planes flying overhead may result in adapted driving behavior. Traffic conditions and congestion may also be extrinsic anomalies. For instance, a particular area of road may be under construction reducing the number of lanes available to vehicles passing through that road region 304. This may result in a bottleneck effect and reduced driving speeds in that area to avoid rear-end collisions.

Anomalies may also be intrinsic. Intrinsic anomalies are dynamic conditions in a road region 304 that affect driving behaviors and are the result of human behavior and decision making. For instance, an erratic driver may be an intrinsic anomaly. A driver may drive in an erratic pattern because the driver is intoxicated. An intoxicated driver may veer out of a lane and into other lanes. An intoxicated driver may also drive well above or well below a posted speed limit and may even alternate unpredictably between high and low speeds. Erratic driving behaviors may also be caused by distracted driving. For instance a driver who is texting or using the phone while driving may veer into neighboring lanes or abruptly slow or stop, blocking traffic. Other conditions may produce erratic driving. For instance a driver's health or vision may become impaired due to a medical condition while the driver is advancing through a road region which may result in diminished control of loss of control of the vehicle and produce erratic driving. A driver may also become engaged in an altercation with one or more passengers in the vehicle which may produce an erratic driving pattern. Other causes for erratic driving patterns, not listed here, are also possible.

Erratic drivers will continue to advance through a road region 304 while displaying erratic driving behaviors. Thus, an erratic driver is more difficult to evade than an anomaly restricted to a particular road region 304. Therefore, classification of anomalies and distinction between extrinsic and intrinsic anomalies has many benefits. By some accounts, intrinsic anomalies are responsible for 90% of traffic accidents, compared with extrinsic anomalies. Therefore, classification of and detection of intrinsic anomalies can ensure more efficient responses and safety controls since directing safety and prevention efforts and resources to intrinsic anomalies will have a greater effect on reducing collisions than indeterminately devoting resources to both extrinsic and intrinsic anomaly situations. Because extrinsic and intrinsic anomalies have different properties and because vehicles respond to extrinsic and intrinsic anomalies in certain ways, the presence of any anomaly and whether the anomaly is extrinsic or intrinsic can be determined by evaluating vehicle patterns.

Once a supposed anomaly is detected relative to a first vehicle, a determination is made/check is performed to see if other vehicles in the relevant vicinity of the first vehicle have engaged in similar actions including but limited to evasive maneuvers. The collective actions of the first vehicle and other vehicles in the relevant vicinity are analyzed to determine a driving pattern for the first and other vehicles in a given road region. The driving pattern is then further analyzed to determine if the driving pattern is consistent with a particular type of anomaly. For instance, the driving pattern may be analyzed to determine if the supposed anomaly is intrinsic or extrinsic.

For example, once the server 302 identifies an evasive maneuver performed by a first vehicle 314, the server 302 may initiate an anomaly classification protocol. First, the server will identify other vehicles 306, 308, 310, 312 sharing the road region 304. Like the first vehicle 314, the other vehicles 306, 308, 310, 312 also measure and record information about themselves and their surrounding environments. The other vehicles 306, 308, 310, 312 may also share this information with the server 302. Based on some or all of this information, the server 302 can determine a pattern consistent with the type of anomaly that the first vehicle 314 evaded. In one embodiment, the server 302 may consider trajectories of the first vehicle 314 and other vehicles 306, 308, 310, 312 to determine the type of anomaly present. For instance, the first vehicle 314 may perform an evasive maneuver and then continue traveling in a consistent forward trajectory 328 through the road region 304. Other vehicles 310, 312 in the road region 304 may not be near the anomaly 300. The trajectories 324, 326 of these other vehicles 310, 312 may continue in a forward pattern through the road region 304. These other vehicles may not perform evasive maneuvers. Other vehicles 306, 308 in the road region 304 may perform a variety of evasive maneuvers. For example, a vehicle 306 may have two or more trajectories available to it that would evade the anomaly 300. A vehicle 306 may evade the anomaly by veering slightly right 316 to evade the anomaly. A vehicle 306 may also perform a lane change and then veer left 318 to evade an anomaly. A vehicle 308 may have two or more trajectories available to it to evade an anomaly. A vehicle 308 may perform a lane change 322 to evade an anomaly. A vehicle 308 may also veer slightly left 320 to evade an anomaly. The server may analyze and consider all of these trajectories 316, 318, 320, 322, 324, 326, 328 to determine a vehicle behavior pattern. The determined vehicle behavior pattern may be consistent with a particular type of anomaly. For example, the determined vehicle behavior pattern may be consistent with an extrinsic anomaly.

A vehicle behavior pattern in a road region 304 may be consistent with an extrinsic anomaly. FIG. 4 shows an example vehicle behavior pattern consistent with an extrinsic anomaly. For instance similarly situated vehicles may perform similar evasive maneuvers at a specific point in the road region 304. The evasive maneuvers may reveal vehicles are avoiding a certain point on the road 304. The evasive maneuvers may also reveal vehicles are decelerating or stopping at a certain point in the road. Other possible patterns exist. The server 302 may determine a detected pattern for a group of vehicles 306, 308, 310, 312, 314 and compare the detected pattern to other patterns detected in the past. The server 302 may, based on the comparison, efficiently determine whether the pattern is consistent with an extrinsic anomaly.

FIG. 5 illustrates a road region 304 in which vehicles negotiate an intrinsic anomaly 400. A first vehicle 310 may perform an evasive maneuver. The first vehicle 310 may alter its trajectory 324 by abruptly reducing its speed. The first vehicle 310 may reduce its speed to create distance and avoid a collision with a nearby vehicle 400 that is following an erratic trajectory 402 and which the first vehicle 310 perceives may veer into the path of the first vehicle 310. The server 302 may detect the evasive maneuver performed by the first vehicle 310. Upon detection of the evasive maneuver performed by the first vehicle 310, the server may initiate an anomaly classification protocol. First, the server will identify other vehicles 306, 308, 312, 314 sharing the road region 304. Like the first vehicle 310, the other vehicles 306, 308, 312, 314 also measure and record information about themselves and their surrounding environments. The other vehicles 306, 308, 312, 314 may also share this information with the server 302. Based on all of this information, the server 302 can determine a pattern consistent with the type of anomaly that the first vehicle 310 evaded. In one embodiment, the server 302 may consider trajectories of the first vehicle 310 and other vehicles 306, 308, 312, 314 to determine the type of anomaly present. For instance, the first vehicle 310 may perform an evasive maneuver by abruptly decelerating 324. Other vehicles 312, 314 in the road region 304 may perform different evasive maneuvers in response to the same anomaly the first vehicle 310 faced to avoid a collision with the anomaly 400. The trajectories 326, 328 of these other vehicles 312, 314 may involve abrupt acceleration through the road region 304 to put distances between themselves and the anomaly 400. Other vehicles 306, 308 in the road region 304 may perform a variety of evasive maneuvers. For example, a vehicle 306 may have two or more trajectories available to it that would evade the anomaly 300. A vehicle 306 may evade the anomaly by veering slightly right 316 to evade the anomaly. A vehicle 306 may also perform a lane change and then veer left 318 to evade an anomaly. A vehicle 306 may opt for an evasive maneuver that covers more distance, such as the lane change and then veering left, if the vehicle 306 observes the anomaly 400 drifting in an unpredictable manner. The vehicle 306 may need to cover more ground via its evasive maneuver to successfully avoid a collision with a moving anomaly 400. The vehicle 306 may veer slightly right 316 if the anomaly 400 is consistently veering slightly left. A smaller evasive maneuver may be sufficient to avoid a collision with an anomaly 400 that drifts slightly in one direction. A vehicle 308 may have two or more trajectories available to it to evade an anomaly 400. A vehicle 308 may perform a lane change 322 to evade an anomaly. A vehicle 308 may also veer slightly left 320 to evade an anomaly. The server may analyze and consider all of these trajectories 316, 318, 320, 322, 324, 326, 328 to determine a vehicle behavior pattern. The determined vehicle behavior pattern may be consistent with a particular type of anomaly. For example, the determined behavior pattern may be consistent with an intrinsic anomaly 400.

A vehicle behavior pattern in a road region 304 may be consistent with an intrinsic anomaly 400. FIG. 4 shows an example vehicle behavior pattern consistent with an extrinsic anomaly. For instance similarly situated vehicles may perform different types of evasive maneuvers at different points in the road region 304. The evasive maneuvers may reveal vehicles are avoiding a moving obstacle on the road.

The evasive maneuvers may provide an indication of the pattern of movement of the obstacle. For example, vehicles may perform quick evasive maneuvers of different types around the same time but not at the same point of the road region 304 if the vehicles, around the same time observe an erratic driver on the road. The evasive maneuvers performed may be more abrupt and may cover more distance if the vehicles observe an intoxicated driver displaying an extremely erratic and quick driving patter. The evasive maneuvers may cover less ground and be less abrupt where the other drivers observe a distracted driver who is driving below the speed limit and consistently veering to one side of a lane. Other possible patterns exist. The server 302 may determine a detected pattern for a group of vehicles 306, 308, 310, 312, 314 and compare the detected pattern to other patterns detected in the past. The server 302 may, based on the comparison, efficiently determine whether the pattern is consistent with an intrinsic anomaly. The server may further identify a particular type of intrinsic anomaly and may assign a safety concern threshold based on the determined type of intrinsic anomaly.

Figure 6:
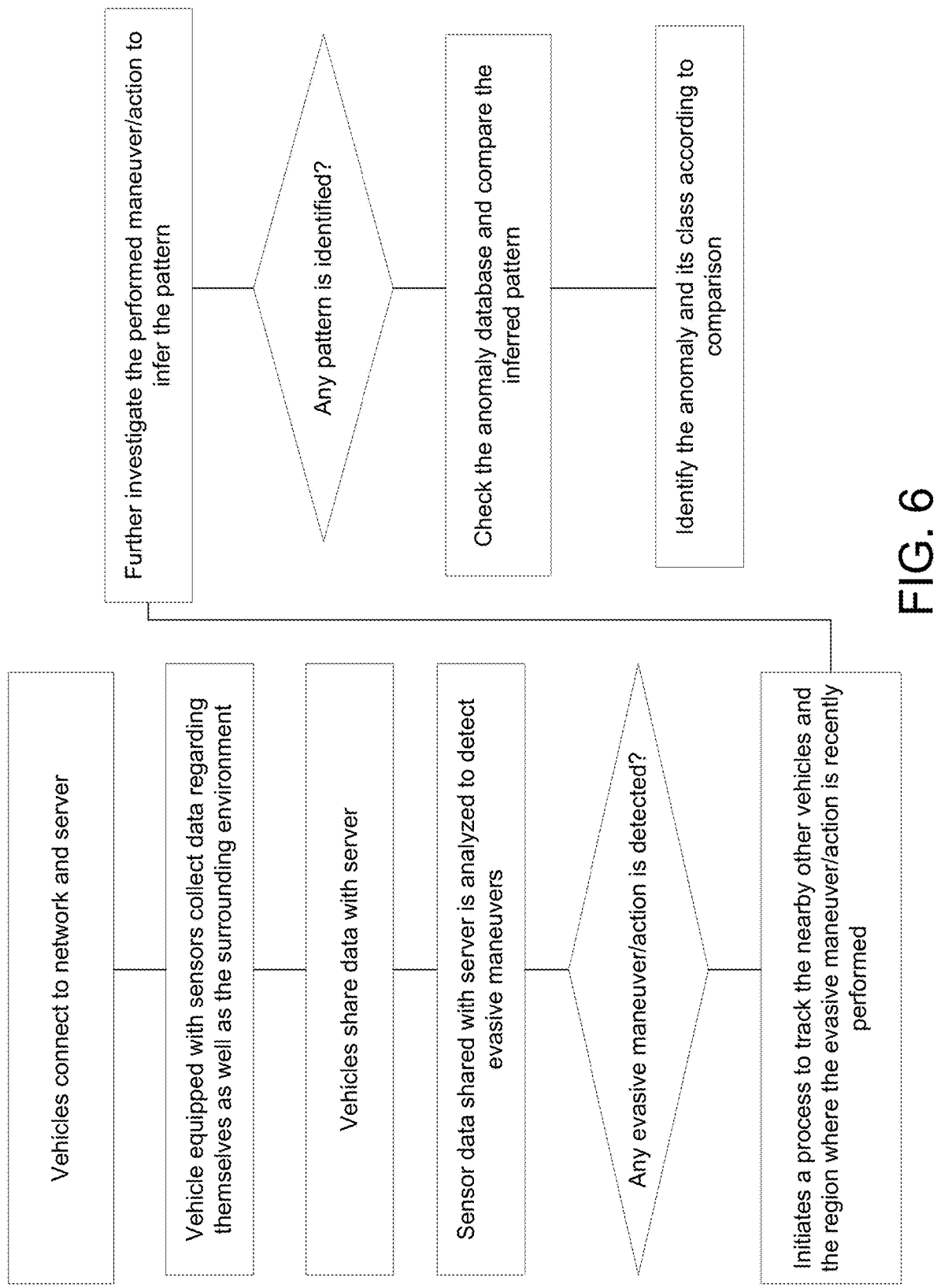
FIG. 6 is an example of a flow diagram of an anomaly detection and classification protocol.

FIG. 6 illustrates an example of an anomaly classification protocol. The protocol begins with vehicles connected to the server measuring properties of themselves and their surrounding environments, as discussed above. The protocol then identifies an evasive maneuver or other relevant driving action based on the analysis of data sensed. If an evasive maneuver or other relevant driving behavior is detected, the server initiates a protocol to track other vehicles sharing a road region where the detected evasive maneuver occurred. An evasive maneuver or other relevant driving behavior may meet a threshold at which point the protocol is initiated. For instance, the evasive maneuver or other relevant driving behavior may continue for a pre-defined duration. The amount of time the evasive maneuver or other relevant driving behavior lasts may signify that the behavior is significant and the anomaly detection protocol should be implemented. For example, a driver may naturally switch lanes to achieve a position closer to the freeway exit if they want to exit the freeway. This time of driving behavior would not occur relatively quickly. In another example, a driver may make a lane change to avoid running into a pothole and then may change back into the original lane. This type of driving behavior may last longer. Additionally, the behavior of nearby vehicles may also confirm a threshold for implemented the protocol is satisfied. For instance, if two or more evasive maneuvers or other relevant driving behaviors are detected in close proximity, geographically and/or temporally, in a road region, then the protocol may be triggered.

The server investigates the performed evasive maneuver and analyzes data sensed by the other vehicles sharing the road region to develop a vehicle behavior pattern for the vehicles in that region. If a pattern is identified, the server checks a database containing anomaly patterns and determines whether the detected pattern is consistent with any patterns in the database. The server can then confirm the presence of anomaly and identify the type of anomaly, e.g., intrinsic or extrinsic.

In an embodiment, an anomaly detection/classification system 200 may be activated if the protocol threshold is met, as described above. The protocol may comprise executable instructions for an anomaly detection/classification circuit 210. Upon detection of an evasive maneuver or other relevant driving behavior satisfying the threshold, an anomaly detection/classification circuit 210 may activate communication with vehicle and environmental sensors, e.g., sensors 152. The anomaly detection/classification circuit 210 may store and process information collected from sensors 152. Based on the sensors 152 information, the anomaly detection/classification circuit 210 may analyze and determine a vehicle behavior pattern for the relevant vehicles in the relevant road region or series of road regions. The analyzed driving pattern may be compared to stored driving patterns in an anomaly database. The stored driving patterns may each map to a specific type of anomaly. Based on the stored driving patterns, the anomaly detection/classification circuit 210 may determine the type of anomaly that maps to the analyzed vehicle behavior pattern. The anomaly detection/classification system 200 may implement the protocol in real-time to immediately and automatically determine the type of anomaly present, without any further action from the vehicles.

Figure 7:
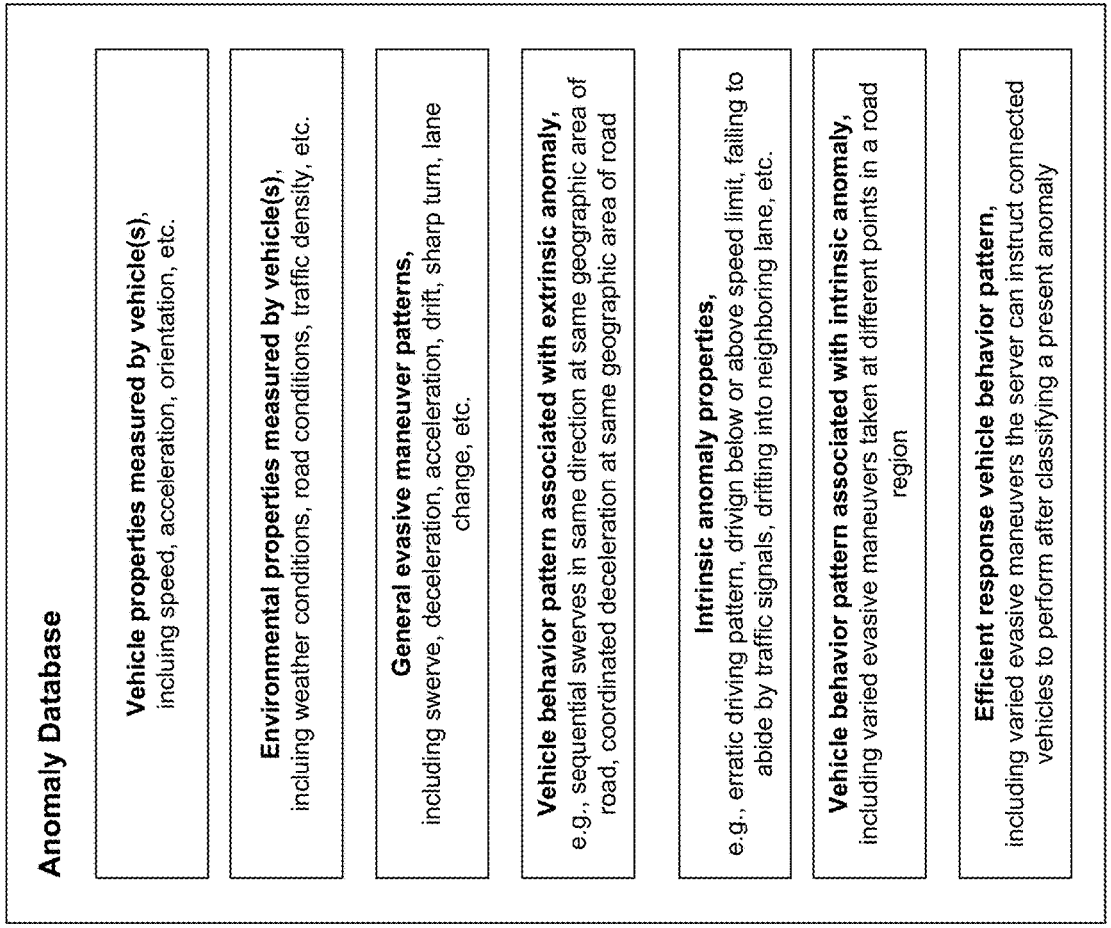
FIG. 7 is an example of an anomaly database.

The technology described herein may involve comparison of determined vehicle behavior patterns to a preexisting database of vehicle behavior patterns. FIG. 7 illustrates an example of an anomaly database. The anomaly database may include vehicle behavior patterns consistent with general evasive maneuvers. The anomaly database may include vehicle properties, a measured by connected vehicles. For example, measured and stored vehicle properties may include particular vehicle speed, vehicle acceleration, vehicle deceleration, the orientation of the vehicle, and other properties.

Measured vehicle properties meeting certain conditions may indicate a connected vehicle is performing or has recently performed an evasive maneuver. For example, swerving, abrupt deceleration, abrupt acceleration, drifting, sharp turns, and lane changes may be vehicle behaviors consistent with evasive maneuvers. These evasive maneuver patterns may be stored in the database so that a vehicle performing an evasive maneuver can be identified.

An anomaly database may also include stored sets of environmental conditions measured by connected vehicles. These environmental conditions may include weather conditions, road conditions including wear and tear and abrasive patches of road, traffic density, the presence of nearby entities that may pose a distraction, the presence of nearby vehicles and their externally observed driving patterns and other conditions.

The anomaly database may also store vehicle behavior patterns. The vehicle behavior patterns may be vehicle behavior patterns detected in the past. The stored vehicle behavior patterns may correspond to either an extrinsic or intrinsic anomaly. For example, several vehicle behavior patterns may be consistent with the presence of an extrinsic anomaly. These patterns may include sequential swerves of different vehicles in a road region in the same direction, at the same geographic point in the road region. This pattern, for instance, may signify the presence of a physical obstacle located at a specific point in the road region. As another example, a vehicle behavior pattern associated with an extrinsic anomaly may be coordinated deceleration of a group of connected vehicles at the same geographic point of a road region. This may signify the presence of an extrinsic anomaly, for instance a bumpy patch of road, in at a particular point in the road region.

The anomaly database may also include vehicle behavior patterns associated with an intrinsic anomaly present in the road region. For instance, a group of vehicles may take varied evasive maneuvers, of different types in a road region. The pattern of evasive maneuvers taken may reveal a moving object that the vehicles are evading as it travels along the road way. In an example, the moving obstacle may be an intoxicated driver following an erratic trajectory. In another example, a group of connected vehicles may perform the same or a similar evasive maneuver, for instance changing to a left lane, at different points along a road region. For example, the vehicles may perform these maneuvers to avoid a distracted driver driving well below the speed limit as the distracted driver advancing through the road region.

The anomaly database may also store properties of intrinsic anomalies themselves. For example, an intrinsic anomaly may be another vehicle sharing the road region that is driving in an erratic manner. The erratic vehicle may itself be connected and may share data about its trajectory. Other nearby vehicles may also be equipped with sensors and may be able to measure and share information about the erratic vehicle. Intrinsic anomaly properties stored in the database may include driving well above or below the speed limit, failing to abide by traffic signals like stop signs, drifting into neighboring lanes, driving in a zig zag pattern, and other properties.

The anomaly database may also store a set of responsive evasive maneuvers. These responsive evasive maneuvers may be communicated preemptively to connected vehicles to plan for a safe and efficient driving pattern when a particular type of anomaly is detected in a road region.

The anomaly database may be continuously and automatically updated, in real-time, as vehicle behavior patterns are detected and mapped to types of anomalies. In an embodiment, connected vehicles may each be equipped with a local copy of the anomaly database. As vehicles travel through a series of road regions, vehicles may connected with local servers. Upon connection to an available server, an updated copy of the anomaly database may be pushed out to each connected vehicle. In another embodiment, the anomaly database may be region-specific. In an embodiment, vehicles may be temporarily unable to connected to a server. In this embodiment, a vehicle having a most up to date copy of the relevant anomaly database may share its copy of the anomaly database with nearby vehicles using vehicle to vehicle communication. A vehicle behavior pattern may be inferred from this smaller group of nearby vehicles. When the vehicles are able to connect to a server they may receive an updated copy of the anomaly database and also update the anomaly database themselves with information detected during the period of lack of connectivity.

Copies of an anomaly database containing vehicle behavior patterns and corresponding anomaly types specific to a particular geographic region may be pushed out to vehicles associated with that geographic region. For example, connected vehicles registered in a particular state, territory, or province, may receive anomaly databases relevant to those states, territories, or provinces. In another example, vehicles passing through a particular geographic area, as confirmed by GPS sensors on or in the vehicle, may receive copies of an anomaly database specific to the region through which the vehicle is traveling.

Example Scenarios

The above described systems and methods may operate in specific circumstances as described below. The below scenario are exemplary only and by no means limit the scenarios under which the systems and methods described herein may apply.

In one example situation, drivers in a road region may encounter heavier than normal traffic. A first driver may decelerate to avoid colliding with a vehicle directly in front of the first vehicle. This deceleration behavior may be detected and shared with the server. The server may also detect similar deceleration behavior from other vehicles in geographic proximity to the first vehicle. Based on these detected deceleration behaviors, an anomaly detection/classification protocol may be initiated. The first vehicle and other vehicles nearby may be equipped with sensors. In this example the sensors may measure the acceleration/deceleration of the vehicle. Other sensors may include cameras. Sensors may also be present in the surrounding environment. For example, traffic lights may be equipped with cameras. Traffic lights may also be equipped with sensors that detect the speed of traffic moving past the traffic lights. The server may collected and analyze sensor data from the first vehicle, nearby vehicles, and the surrounding infrastructure. The server may determine a driving behavior pattern. In this case the driving behavior pattern may be collective deceleration of a large group of vehicles concentrated in a specific geographic area. The server may then compare this driving pattern to driving patterns stored in an anomaly database. The anomaly database may contain one or more similar patterns wherein a similarly sized group of vehicles located in close geographic proximity to each other collectively decelerate. The anomaly database may map this driving pattern to a specific type of anomaly. The type of anomaly may be an extrinsic anomaly, such as heavy traffic congestion in a particular area of the road. The anomaly database may include more detailed information. For instance the patterns may map to a heavy traffic anomaly specifically caused by a lane closure. Alternatively, the anomaly database may not contain more detailed information and may request information from sensors on vehicles and the surrounding infrastructure to confirm the type of anomaly.

In a second example scenario, drivers advancing through a series of road regions may encounter an intoxicated driver. A first driver may change lanes to distance themself from the drunk driver. This lane change behavior may be detected and shared with the server. Based on the duration of the lane change, the server may determine a threshold has been met and initiate anomaly detection/classification protocol. The first vehicle may be equipped with sensors. In this example the sensors may measure the torque, orientation, and/or speed of the vehicle. Other sensors may include cameras. Sensors may also be present on nearby vehicles and in the surrounding environment. For example, traffic lights may be equipped with cameras. Traffic lights may also be equipped with sensors that detect the speed of traffic moving past the traffic lights. The server may collected and analyze sensor data from the first vehicle, nearby vehicles, and the surrounding infrastructure. The server may determine a driving behavior pattern based on this collected information. In this case the collected information may show that several vehicles are performing evasive maneuvers, e.g., lane changes, swerving, deceleration, relative to a trajectory through the series of road regions. The collected information may show that the event which the first vehicle and nearby vehicles avoided is moving. In one embodiment, the sensors may show that drivers change lanes well before encroaching on the trajectory of the moving obstacle. In another embodiment, the collected information may show that drivers do not change lanes immediately upon coming into proximity of the moving obstacle. The server may compare the determined driving pattern to driving patterns stored in an anomaly database. In this case, the driving pattern may be similar to one or more stored patterns corresponding to a specific type of intrinsic anomaly—an intoxicated driver. In an embodiment, the server may further determine a risk threshold based on detected information and comparison. For example, the driving pattern may reflect that nearby vehicles perform evasive maneuvers and other defensive driving behaviors well before encroaching on the trajectory of the drunken driver. This pattern may reveal the intrinsic anomaly poses a high risk because drivers are eager to evade it well in advance.

In another embodiment, when a high risk anomaly is detected, the system may gather further information to increase the confidence level of its risk assessment and anomaly type determination. For example, in the case of the high risk intoxicated driver, above, the system may request camera data from nearby vehicles. The system may specifically request camera data from a vehicle having the closes proximity to the intoxicated driver because that vehicle may have the most accurate information. The system may alternative request data from a vehicle that most recently was near the intoxicated driver.

Applications

Figure 8:
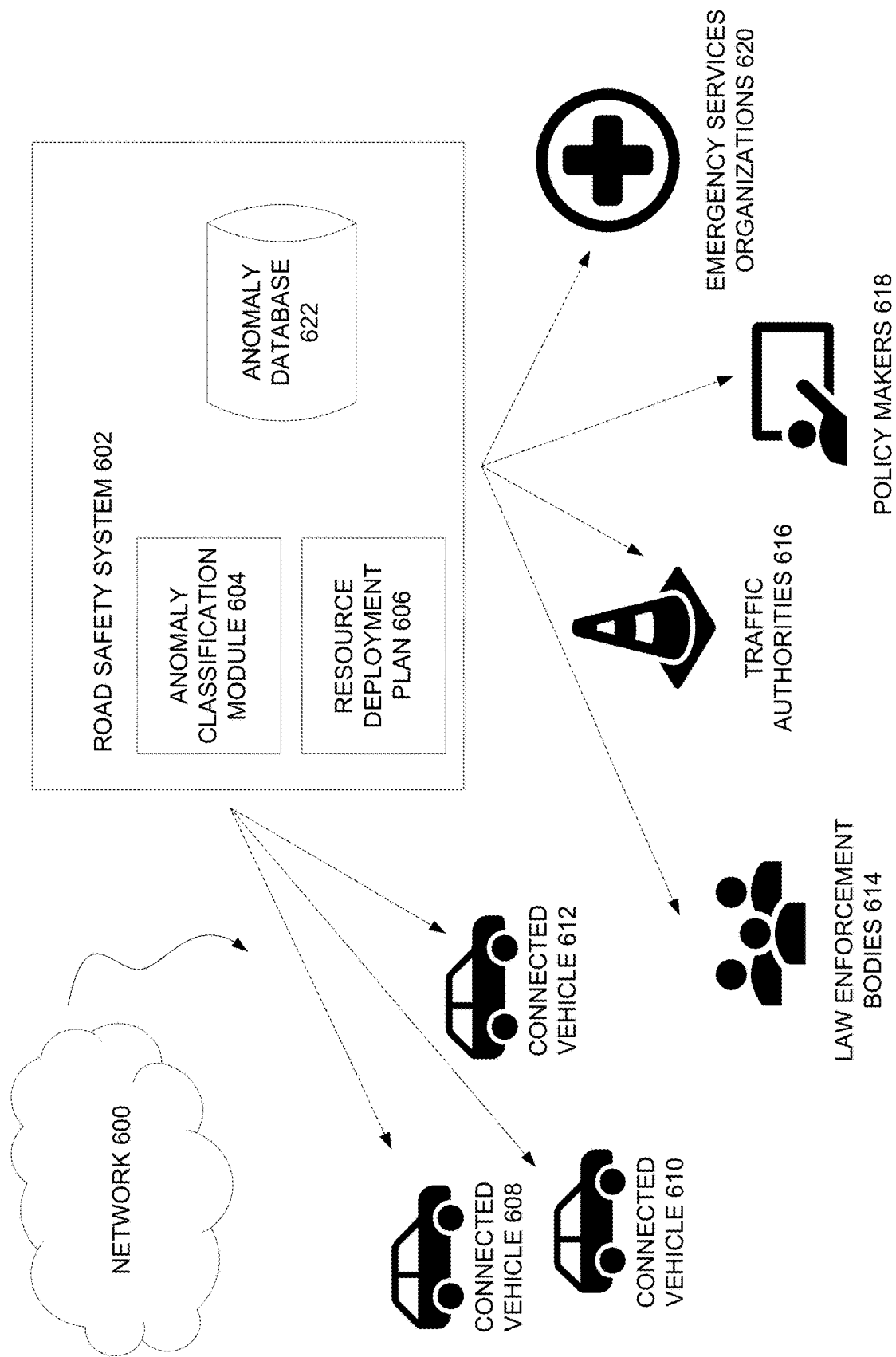
FIG. 8 is an example of a road safety system including connected vehicles, connected resources, and an anomaly classification module.

The technology for classifying and ranking anomalies disclosed herein may be used as part of a road safety system. An example of a road safety 602 system a is illustrated in FIG. 8. Vehicles 608, 610, 612 may be connected to a network 600. Consistent with the above disclosure, connected vehicles 608, 610, 612 may be equipped with sensors and may measure their own properties, e.g., speed, acceleration, etc., as well as properties of their surrounding environment, e.g., traffic, weather, presence of nearby vehicles, etc. The data recorded by the connected vehicles 608, 610, 612 may be analyzed by an anomaly classification module 604. The anomaly classification module 604 may detect that a first connected vehicles has recently performed an evasive maneuver. The anomaly classification module may then analyze data from nearby connected vehicles to determine a vehicle behavior pattern for the region where the first connected vehicle and nearby connected vehicles are present. The anomaly classification module 604 may then compare the determined vehicle behavior pattern to other vehicle behavior patterns stored in an anomaly database 622 to determine whether the anomaly is extrinsic or intrinsic. In an embodiment, the anomaly classification module 604 may also compare the determined vehicle behavior pattern to other vehicle behavior patterns stored in an anomaly database 622 to determine, if the anomaly is intrinsic, the level of risk posed by the intrinsic anomaly. Based on the classification of the anomaly and/or the determine level of risk, a resource deployment plan 606 may be imitated.

In one example scenario, anomaly detection/classification systems and methods may detected an intoxicated driver. Upon detection of the intoxicated driver, the server may communicate with connected law enforcement bodies. The server may, in real-time implement an automatic resource deployment protocol through the law enforcement body or bodies. For example, a patrol car may automatically be sent to the geographic area in which the intoxicated driver is predicted to advance through upon confirmation that the detected driving behavior pattern corresponds to an intoxicated driver. In another example scenario, an identified driving pattern may corresponding to a particular type of intrinsic anomaly—a driver experiencing a medical emergency. For example, the driving behavior pattern may reveal that drivers are merging left to evade a slow moving vehicle in the left lane and/or shoulder of the freeway. This type of pattern may correspond to a medical emergency scenario. In this situation, resources may be deployed in real-time. The resources may include an ambulance instead of a patrol car.

In another example scenario, the driving behavior pattern may reveal that the anomaly is extrinsic and is an adverse weather pattern. For instance, the driving behavior pattern may correspond to a highly dangerous patch of icy road on the freeway. Upon classification of the anomaly, road maintenance services may be deployed to the affect area to clear the icy patch of road.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up user device, user system, and non-decrypting cloud service. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A road safety system comprising:
one or more processors; and
memory operatively connected to the one or more processors, the memory including computer code that when executed by the one or more processors causes the road safety system to:
collect sensor data of vehicles in a road region, the vehicles comprising a network of connected vehicles sharing respective sensor data with the road safety system;
determine, based on the collected sensor data, a collective vehicle behavior pattern for the vehicles;
compare the collective vehicle behavior pattern for the vehicles to other collective vehicle behavior patterns stored in a database;
based on the comparison, classify an anomaly present in the road region using a binary classification between an extrinsic anomaly or intrinsic anomaly, wherein:
an extrinsic anomaly comprises a physical condition present in the road region that does not depend on real-time or ongoing human behavior and decision making, and
an intrinsic anomaly comprises a dynamic condition in the road region that is a result of irregular driving behavior by a human driver that is determined to exceed a driving behavior threshold; and
responsive to classifying the anomaly present in the road region as an intrinsic anomaly, transmit an alert to at least one of vehicles in the road region and connected authorities.

2. The road safety system of claim 1, wherein the memory includes further computer code that when executed by the one or more processors causes the road safety system to detect an evasive maneuver performed by a first vehicle of the vehicles and identify secondary vehicles of the vehicles.

3. The road safety system of claim 1, wherein the memory includes further computer code that when executed by the one or more processors causes the road safety system to:
when a collective vehicle behavior pattern consistent with the collective vehicle behavior pattern for the vehicles is not present in the database, employ human observation techniques to classify the anomaly present in the road region as an extrinsic or intrinsic anomaly.

4. The road safety system of claim 1, wherein the memory includes further computer code that when executed by the one or more processors causes the road safety system to:
when the anomaly present in the road region is classified as an intrinsic anomaly, determine, based on the comparison of the collective vehicle behavior pattern for the vehicles and other collective vehicle behavior patterns, a level of risk posed by the intrinsic anomaly.

5. The road safety system of claim 1, wherein the database comprises collective vehicle behavior patterns for a selected geographic region.

6. A road safety system comprising:
one or more processors; and
memory operatively connected to the one or more processors, the memory including computer code that when executed by the one or more processors causes the road safety system to:
collect sensor data from vehicles and environmental entities,
determine a collective vehicle behavior pattern for the vehicles based on the sensor data;
compare the collective vehicle behavior pattern to other collective vehicle behavior patterns;
based on the comparison, classify an anomaly present in a road region using a binary classification between an extrinsic anomaly or intrinsic anomaly, wherein:
an extrinsic anomaly comprises a physical condition present in the road region that does not depend on real-time or ongoing human behavior and decision making, and
an intrinsic anomaly comprises a dynamic condition in the road region that is a result of irregular driving behavior by a human driver that is determined to exceed a driving behavior threshold; and
transmit control instructions to at least one of the vehicles in the road region to perform evasive maneuvers based on the classification of the anomaly as an extrinsic or intrinsic anomaly.

7. The road safety system of claim 6, further comprising an anomaly database, wherein the anomaly database stores collective vehicle behavior patterns consistent with classification of anomalies.

8. The road safety system of claim 7, wherein the anomaly database further comprises efficient collective vehicle behavior patterns of the collective vehicle behavior patterns that are transmitted as instructions to vehicles in response to a detected and classified anomaly.

9. The road safety system of claim 7, wherein the anomaly database further comprises responsive resource deployment plans that are transmitted as instructions to connected authorities in response to a detected and classified anomaly.

10. The road safety system of claim 9, wherein connected authorities are selected from the group consisting of: law enforcement bodies, traffic control authorities, policymakers, and emergency services providers.

11. The road safety system of claim 9, wherein the determined collective vehicle behavior pattern is consistent with the irregular driving by the human driver and avoidance of the irregularly driving human driver.

* * * * *